(No Model.) 2 Sheets—Sheet 1.
W. J. SPALDING.
COMBINED GARDEN DRILL AND SEED SOWER.

No. 311,385. Patented Jan. 27, 1885.

WITNESSES
F. L. Ourand
E. G. Siggers

INVENTOR
Wm. J. Spalding
by C. A. Snow & Co
Attorneys (No Model.) 2 Sheets—Sheet 2.

W. J. SPALDING.
COMBINED GARDEN DRILL AND SEED SOWER.

No. 311,385. Patented Jan. 27, 1885.

WITNESSES

INVENTOR
Wm J. Spalding

UNITED STATES PATENT OFFICE.

WILLIAM J. SPALDING, OF LOCKPORT, NEW YORK.

COMBINED GARDEN-DRILL AND SEED-SOWER.

SPECIFICATION forming part of Letters Patent No. 311,385, dated January 27, 1885.

Application filed March 11, 1884. (No model.)

*To all whom it may concern:*

Be it known that I, WILLIAM J. SPALDING, a citizen of the United States, residing at Lockport, in the county of Niagara and State of New York, have invented a new and useful Combined Garden-Drill and Seed-Sower, of which the following is a specification, reference being had to the accompanying drawings.

This invention has relation to garden-seed drills and grass-sowers combined; and it consists in the construction and novel arrangement of parts, as will be hereinafter fully described, and particularly pointed out in the claim appended.

Figure 1:
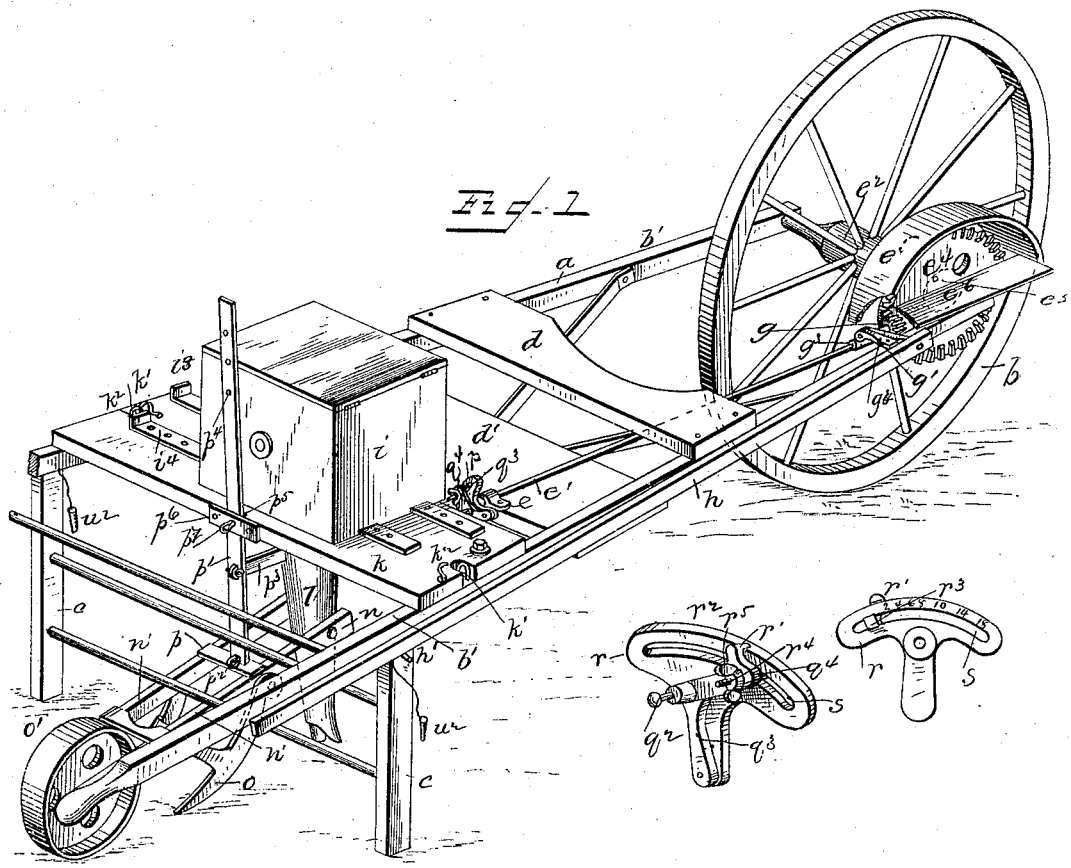
Figure 2:
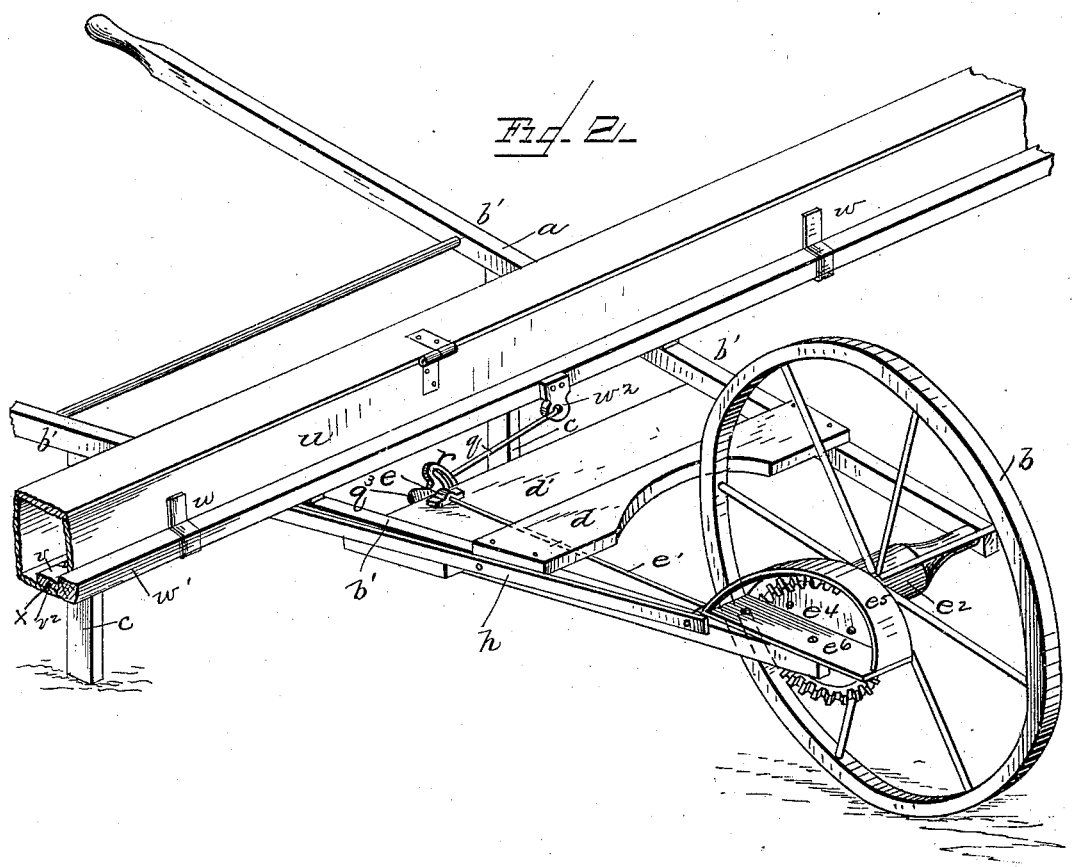

Figure 1 is a view in perspective of the improved machine arranged as a garden-seed drill. Fig. 2 is a view of the machine arranged as a grass-seed sower.

Referring by letter to the accompanying drawings, $a$ designates the frame of the machine, which comprises the side bars and handles supported on the barrow-wheel $b$, and provided with the two legs $c\ c$.

Immediately back of the wheel $b$ the side bars, $b'\ b'$, are connected by a top board, $d$, and in rear of this board $d$ and secured to the under edges of the side bars is a second board, $d'$, upon which the rear bearing, $e$, for the operating-shaft $e'$, is secured. The wheel $b$ is provided with an enlarged hub, $e^2$, tapering at its ends, and having its bearings in the forward ends of the side bars. This hub $e^2$ is provided near one end with a shoulder, $e^3$, to the vertical face of which a large miter-wheel, $e^4$, is secured by four screws. The upper portion of the miter-wheel $e^4$ is protected by a semicircular guard, $e^5$, secured to a strip, $e^6$, fastened upon the side bar at that end of the hub. The front end of the operating-rod $e'$ is provided with a pinion, $g$, and the front bearing, $g'$, for this rod consists of an arm, $g^2$, having an eye, $g^3$, at its lower end, pivoted to an inwardly-extending arm, $g^4$, fixed to the side bar, the outer end of the pivoted arm $g^2$ being secured in the forward end of a wooden lever, $h$, pivoted to the outside of the side bar at that side, and having its rear end adapted to engage a lateral pin, $h'$, in the said side bar, to throw the pinion $g$, and consequently the machine, in and out of gear. The rock-shaft in the hopper $i$ is provided on its rear end with a crank-arm, $q$, having a perforation near its outer end to engage the pitman-rod $q'$, pivoted to the stud $q^2$ on the angular indicator-arm $q^3$, pivoted by one of its arms, $q^4$, to the slotted gage $r$, fixed to the rear end of the operating-shaft so as to revolve with it. The indicator-finger $r'$ is cast with the arm $r^2$ of the angular indicator-arm $q^3$, and is provided with a head-bolt, $r^3$, and a washer and thumb-nut, $r^4\ r^5$, by which the indicator-arm is adjusted in the curved slot $s$, to regulate the length of the stroke of the crank-arm, so that the sweep of the agitators in the hopper $i$ may be indicated and known. The rear face of the slotted gage is graduated by even numbers from 6 to 14, and the finger may be adjusted to regulate the sweep of the agitators to suit garden-seeds of different kinds or different sizes of the same kind.

In order to change from a garden-seed drill to a grass-sower, the hopper $i$ should be removed, the board on which the hopper $i$ is secured being removed by disengaging the hook-bolts from the side bars. The grass-seed hopper $u$ is then put in place, the slotted cleats $u'\ u'$ on its bottom being slipped over the staples in the upper edges of the side bars, and the plugs $u^2\ u^2$ passed through the staples over the tops of the cleats $u'\ u'$ to hold the grass-seed hopper in place. This hopper $u$ is from twelve to sixteen feet long. The front is three and one-half inches high, the rear side three inches, and the bottom two and one-fourth inches wide. To the front face of this hopper are secured the guide-brackets $w$, in which the wooden agitating-rod $w'$ is shifted laterally when its eye $w^2$ is in engagement with the pitman-rod extending from the angular indicator-arm.

Having thus fully described my invention, what I claim as new, and desire to secure by Letters Patent of the United States, is—

In a combined garden-seed drill and grass-seed sower, the combination, with the frame of the machine provided with the board secured to the under faces of the side bars, and the barrow-wheel provided with the shouldered hub having the miter-wheel secured to its vertical face, of the operating-rod supported in a bearing on the strengthening-board, and provided at that end with a slotted gage, a pivoted angular indicator-arm, provided with an adjusting-bolt and thumb-nut, and a stud to which the pitman-rod is pivoted, and at the other end with a pinion and a pivoted arm connected with a pivoted lever at the side of one of the side bars, for throwing the pinion in and out of gear with the miter-wheel, substantially as specified.

In testimony that I claim the foregoing as my own I have hereto affixed my signature in presence of two witnesses.

WILLIAM J. SPALDING.

Witnesses:
V. M. DOUGLAS,
A. F. BROWN.